United States Patent [19]

Strolle et al.

[11] Patent Number: 5,386,249
[45] Date of Patent: Jan. 31, 1995

[54] VIDEO MOTION DETECTOR WITH FULL-BAND RESPONSE EXCEPT FOR DIAGONAL SPATIAL FREQUENCIES

[75] Inventors: Christopher H. Strolle, Glenside, Pa.; Jung W. Ko, Lawrenceville, N.J.

[73] Assignee: SamSung Electronics Co., Ltd., Suwon, Rep. of Korea

[21] Appl. No.: 824,212

[22] Filed: Jan. 22, 1992

[51] Int. Cl.$^6$ .................................. H04N 9/64
[52] U.S. Cl. ........................ 348/701; 348/700; 348/669
[58] Field of Search ............... 358/166, 167, 36, 37, 358/105, 31, 39, 40; H04N 9/78, 9/64; 348/607, 665, 667, 669, 624, 630, 625, 712, 713, 700, 701

[56] References Cited

U.S. PATENT DOCUMENTS

| | | | |
|---|---|---|---|
| 4,597,007 | 6/1986 | Reitmeier et al. | 358/31 |
| 4,831,463 | 5/1989 | Faroudja | 358/31 |
| 4,868,650 | 9/1989 | Weckenbrock | 358/105 |
| 4,884,136 | 11/1989 | Ninomiya | 358/105 |
| 4,953,032 | 8/1990 | Suzaki | 358/36 |
| 4,974,065 | 11/1990 | Murakami | 358/31 |
| 5,083,203 | 1/1992 | Ko et al. | 359/105 |
| 5,095,354 | 3/1992 | Sokawa | 358/105 |
| 5,113,262 | 5/1992 | Strolle | 358/310 |

Primary Examiner—James J. Groody
Assistant Examiner—Sherrie Hsia
Attorney, Agent, or Firm—Robert E. Bushnell

[57] ABSTRACT

In each of various motion detectors operative on composite video signal comprising chrominance component signals as well as a luminance component signal, the chrominance component signals are suppressed with a filter that removes only diagonal high frequencies in the spatial-frequency domain. These diagonal high frequencies in the spatial-frequency domain include the chrominance signal components of the composite video signal if it is in accordance with an appropriate standard, such as that employed by broadcasters in the United States of America. Motion detection is improved by reason of including more of the spatial high-frequency components.

43 Claims, 7 Drawing Sheets

SIGNALS
110 & 111

H : HORIZONTAL
V : VERTICAL

SIGNAL
112

SIGNAL
114

SIGNAL 206

H : HORIZONTAL
V : VERTICAL

SIGNAL 208

SIGNAL 210

SIGNAL 306

H : HORIZONTAL
V : VERTICAL

SIGNAL 308

SIGNAL 310

SIGNAL 408

SIGNAL 406

VIDEO MOTION DETECTOR WITH FULL-BAND RESPONSE EXCEPT FOR DIAGONAL SPATIAL FREQUENCIES

BACKGROUND OF THE INVENTION

The invention relates to a motion detector circuit for detecting indications of change in portions of the images described by a raster-scanning composite video signal.

Raster scanning is a procedure in which the two mutually orthogonal spatial-frequency dimensions of each of a succession of images are conformally mapped into a linear time domain.

Motion detectors are used in a variety of television image processing applications, and the motion detectors of this invention are useful in many of these applications. Of particular interest to the inventors is the use of a motion detector in the video tape recording of television broadcast or similar television signals, in which video tape recording folded-luminance signals are employed. The specification and drawing of U.S. Pat. No. 5,113,262 issued May 12, 1992 to C. H. Strolle et alii and entitled "VIDEO SIGNAL RECORDING SYSTEM ENABLING LIMITED BANDWIDTH RECORDING AND PLAYBACK" are incorporated herein by reference. The inventors sought to improve the motion signal separation circuit 106 as shown in FIG. 2 of that application over the circuitry comprising the elements 216, 218, 220 and 222 shown in FIGS. 3 and 4 of that application.

Each of various motion detectors known in the art include a frame comb filter (or possibly a field comb filter), which comb filter is followed in cascade by a low-pass filter that is used to suppress chrominance signal components in the response of the comb filter. The comb filter is used for obtaining a derivative, primarily with respect to time, of a composite video signal that at least at times is likely to include chrominance signal components. The low-pass filter may, as shown in U.S. Pat. No. 5,113,262, be constructed by differentially combining the input and output signals of a high-pass filter. The low-pass filter, operating in the time domain, has the following effect in the two-dimensional spatial-frequency domain that is mapped into the time domain by raster scanning. Essentially all higher spatial frequencies in the direction parallel to line scan are eliminated.

The time domain response of the low-pass filter is often supplied to a post-processor. In a typical post-processor those portions of the response of the low-pass filter which have a magnitude larger than a prescribed threshold value are detected to generate indications that the corresponding portions of the composite video signal describe portions of the image likely to be moving. Such indications may be single-bit in nature, generating a response in the spatial-frequency domain that changes with time and exhibits step transitions in the two mutually orthogonal spatial-frequency dimensions. In such case the post-processor often includes circuitry for performing spatial filtering procedures that generate a response to the single-bit indications in which the abrupt step transitions are replaced by more gradual transitions. Weckenbrock describes representative such circuitry in his U.S. Pat. No. 4,868,650 issued Sep. 19, 1989 and entitled "CIRCUITRY FOR EXPANDING THE EFFECT OF A VIDEO CONTROL SIGNAL IN MULTIPLE DIMENSIONS". Ko describes other representative such circuitry in his U.S. Pat. No. 5,083,203 issued Jan. 21, 1992 and entitled "CONTROL SIGNAL SPREADER".

When video tape recording television broadcast or similar television signals using frequency-folding of luminance signals to gain improved luminance bandwidth, as U.S. Pat. No. 5,113,262 describes, it is desirable to process moving portions of the television images differently from their stationary portions using an adaptive spatio-temporal filter. A spatio-temporal filter operates in the dimension of time between fields and in the two dimensions of image space that are parallel with and transverse to scan lines, respectively. When there is no or almost no change in a picture element from one frame to the next, frame averaging is used to reduce the noise level in the picture without loss of detail information and frame differencing is used to separate chroma from luma during recording. These are temporal filtering measures. When there is substantial change in a picture element from one frame to the next, as occurs when there is local image motion, frame averaging is dispensed with to avoid blurring, and transversal spatial filtering is used to separate chroma from luma during recording. There is a loss of vertical resolution in the luminance that accompanies the transversal spatial filtering, but human vision tolerates reduced spatial resolution in moving portions of an image. A motion detector is used during video tape recording to control the switching between the two modes of operation.

A motion detector of the type that uses a low-pass filter to suppress chrominance signal components in the response of the comb filter unfortunately also suppresses changes with time in the finer details of the luminance signal, such that the movements of areas of the image that have uniform surface texture are not easily detected. The invention is directed to avoiding this short-coming. The failure to detect the movements of areas of the image that have uniform surface texture causes them to be processed as stationary portions of the image; and the frame averaging reduces the moving uniform surface texture as if it were just noise, causing an undesirable diminuition of moving detail.

SUMMARY OF THE INVENTION

In each of various motion detectors embodying the invention, chrominance information undesirably accompanying luminance information is suppressed by means other than: a low-pass filter operating in the time domain to eliminate in the spatial-frequency domain essentially all higher spatial frequencies in the direction parallel to line scan. In each of various motion detectors embodying the invention, the chrominance information is suppressed with a filter that removes only diagonal high frequencies in the spatial-frequency domain. These diagonal high frequencies in the spatial-frequency domain include the chrominance signal components of the composite video signal if it is in accordance with an appropriate standard, such as that employed by broadcasters in the United States of America.

3

Figure 3:
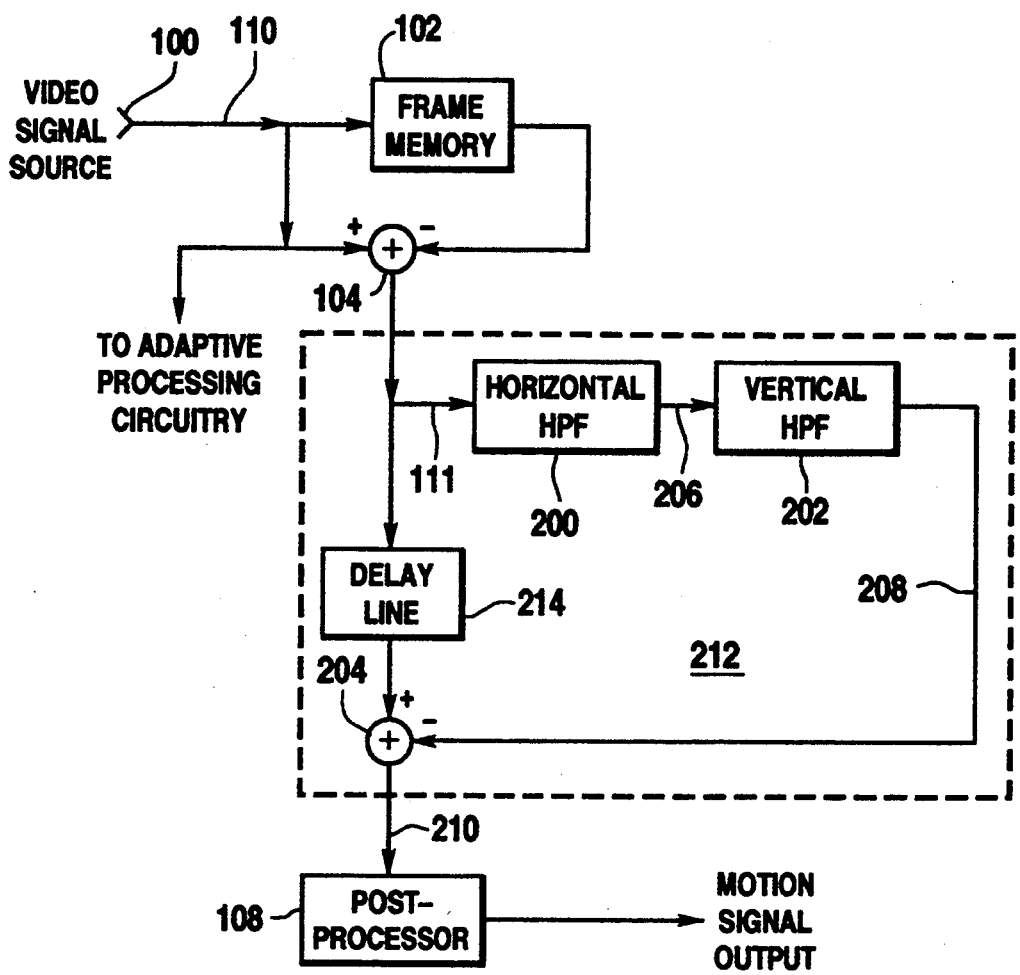

FIG. 3 shows a motion detector embodying an aspect of the invention.

Figure 1:
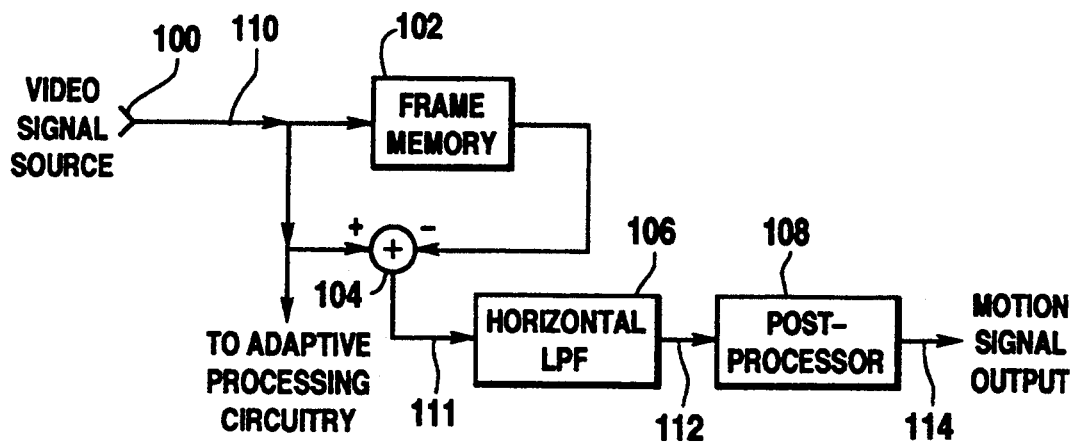
FIG. 1 shows a conventional motion detector.
Figure 4A:
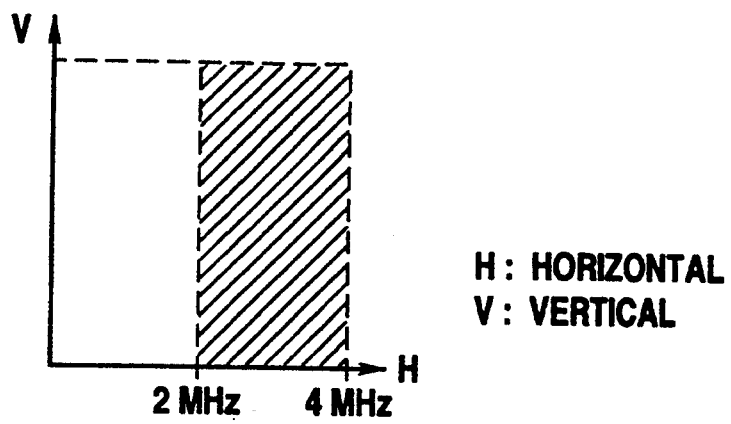
Figure 4B:
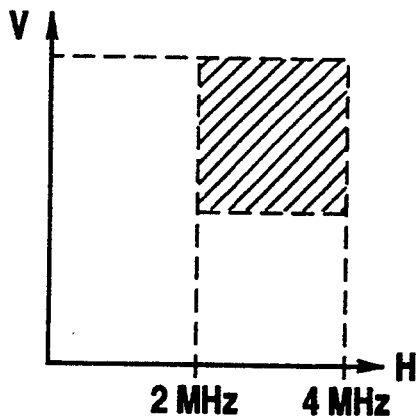
Figure 4C:
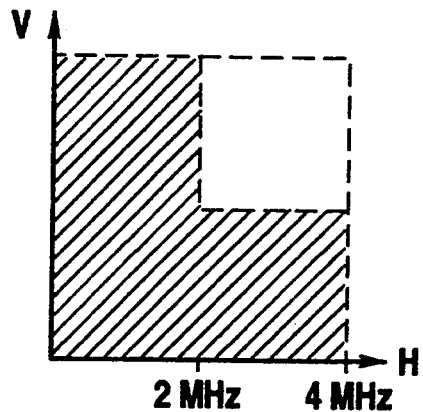

FIG. 4A through 4C show spatial frequency domains of interest in describing the operation of the FIG. 3 motion detector and comparing its capability of detecting frame-to-frame changes with that of the FIG. 1 motion detector.

Figure 5:
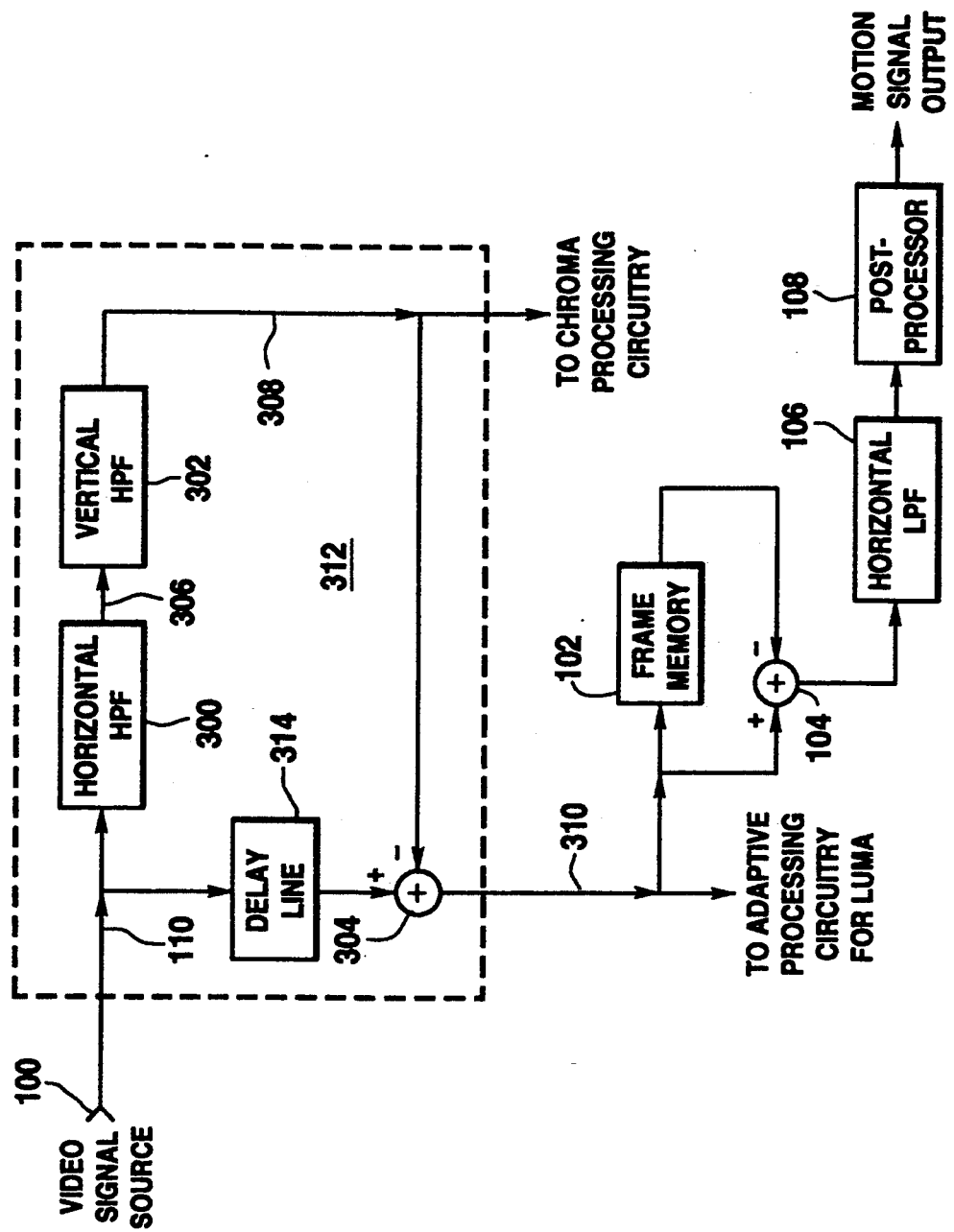

FIG. 5 shows a motion detector, which in accordance with another aspect of the invention, is operated together with a pre-filter for removing chrominance components from the luminance signal acted upon by the motion signal.

Figure 6A:
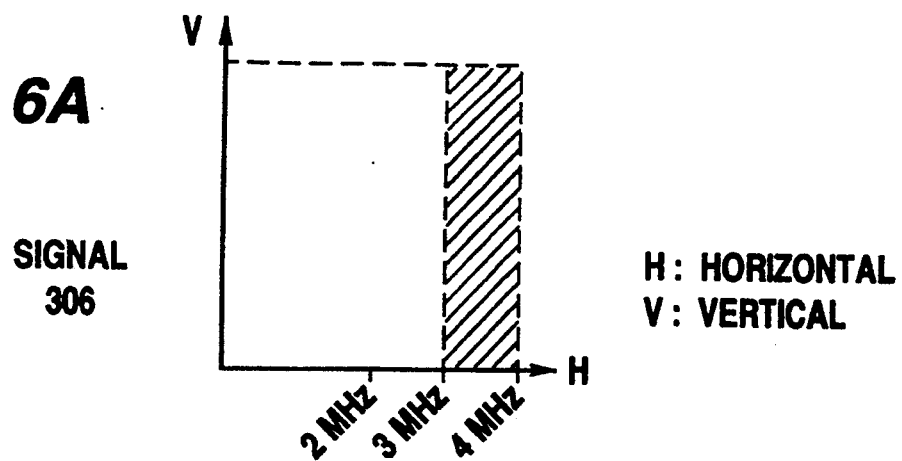
Figure 6B:
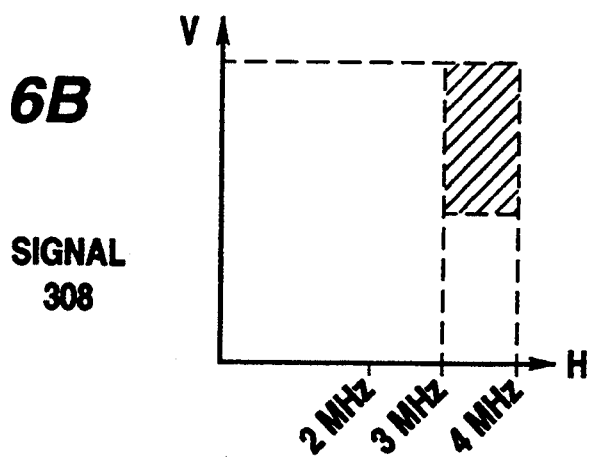
Figure 6C:
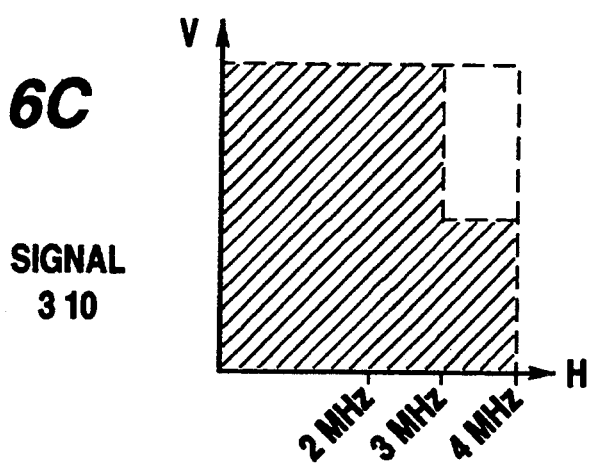

FIGS. 6A through 6C show spatial frequency domains of interest in describing the operation of the FIG. 5 motion detector operated together with a pre-filter for removing chrominance components from the luminance signal acted upon by the motion signal.

Figure 7:
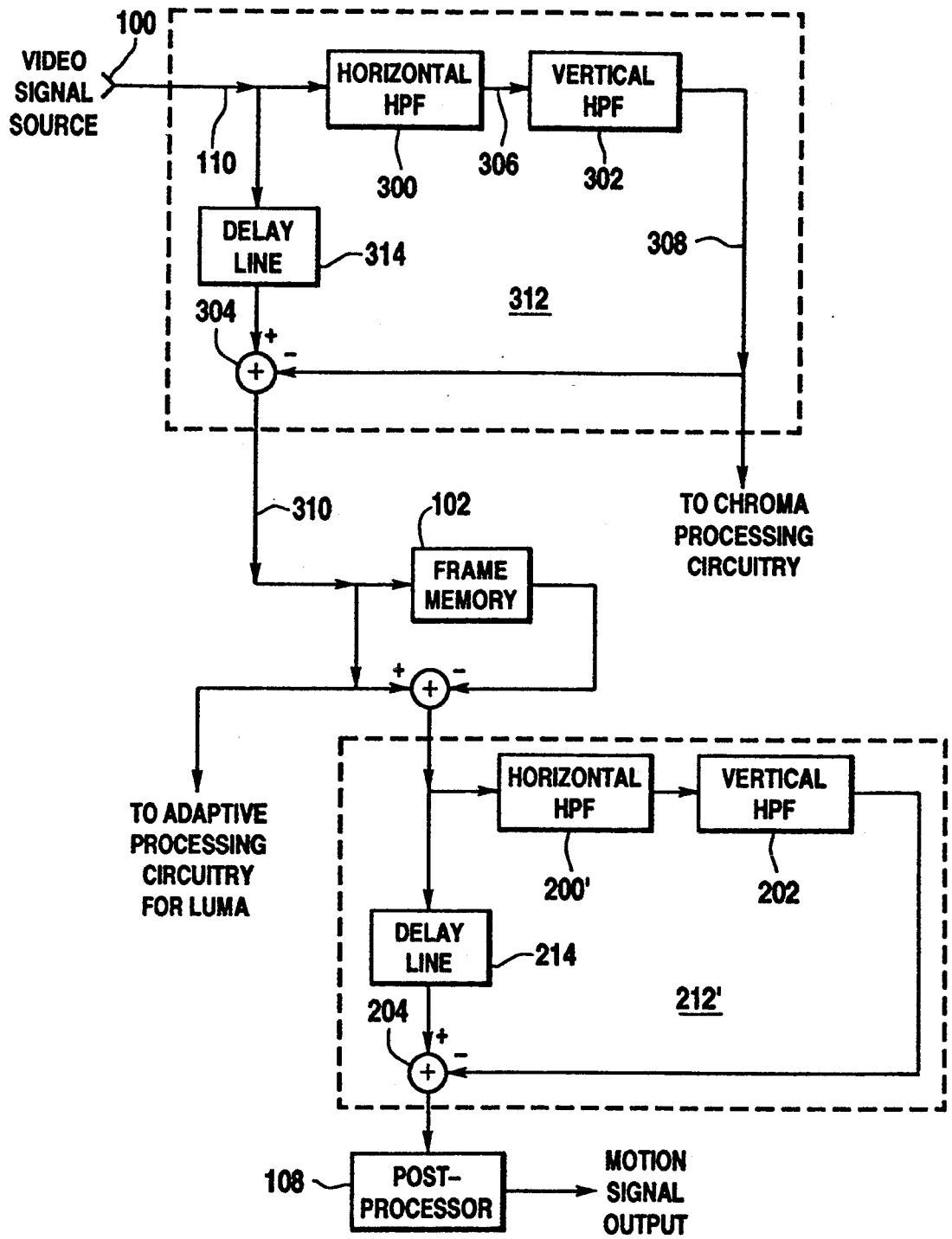

FIG. 7 shows a FIG. 3 motion detector operated together with a pre-filter for removing chrominance components from the luminance signal acted upon by the motion signal in an embodiment of the invention.

Figure 8:
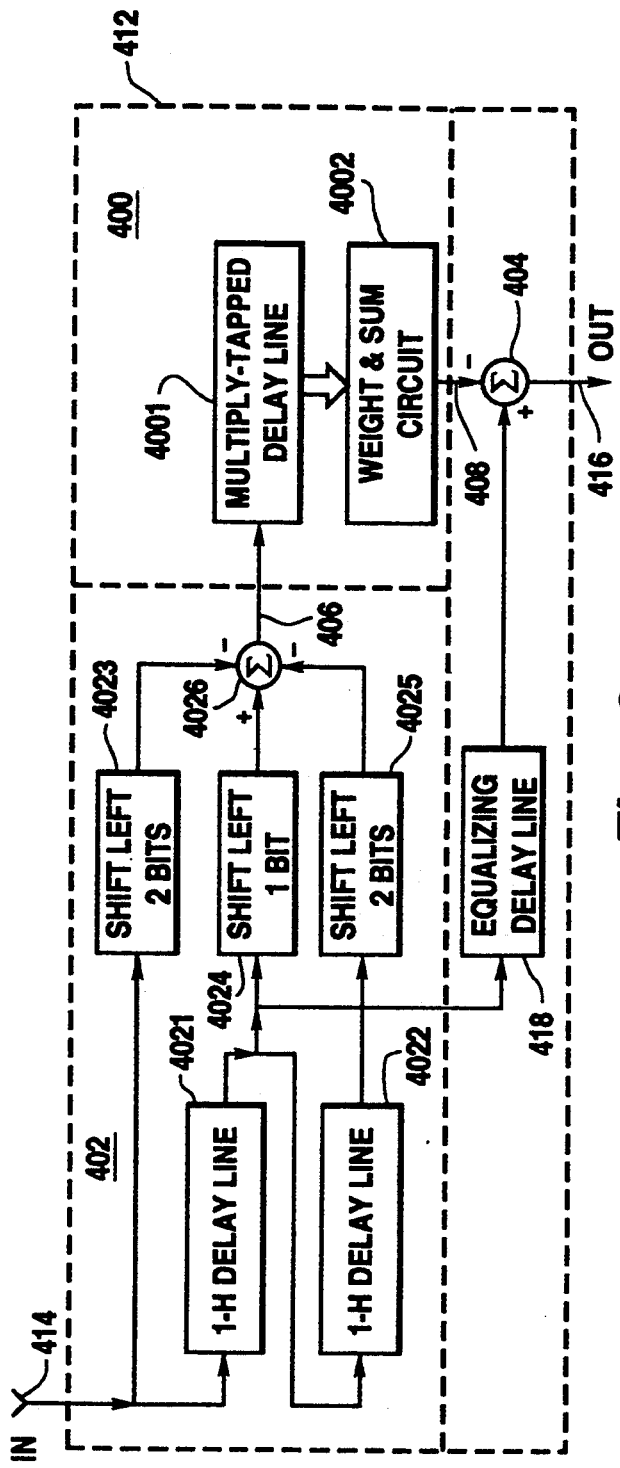

FIG. 8 shows a modification that is made in the motion detectors of FIGS. 3, 5 and 7 in still further embodiments of the invention.

Figure 9B:
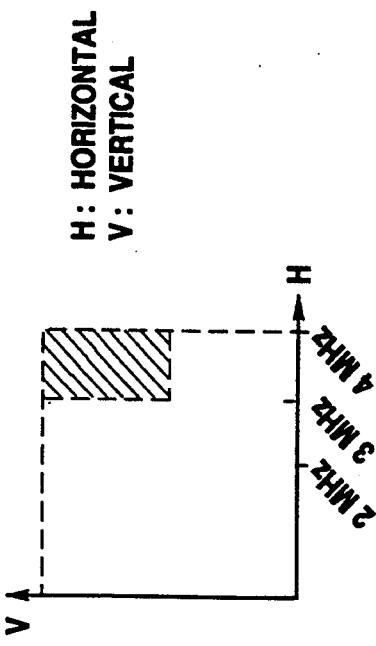
Figure 9A:
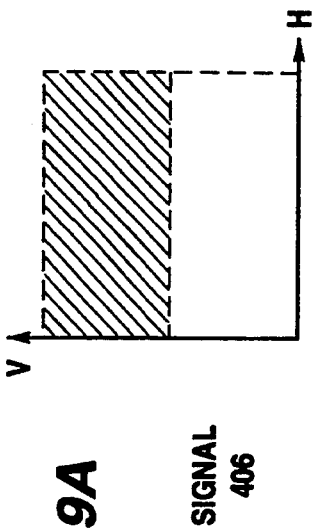

FIGS. 9A and 9B show spatial frequency domains of interest in describing the operation of the FIG. 8 modification.

DETAILED DESCRIPTION OF THE INVENTION

The circuits to be described are described assuming them to be constructed as digital circuits, but corresponding analog circuits will suggest themselves to one skilled in the arts of electronic design and acquainted with the following specification. Such corresponding analog circuits should be considered to be within the scope of the claims following this specification.

In FIG. 1 an input terminal 100 is adapted for connection to a source (not shown) of composite video signal. The input terminal 100 connects both to a write input connection for a frame memory 102 and to a minuend terminal of a subtractor 104. There is a read output connection of the frame memory 102 to the subtrahend terminal of the subtractor 104. An output terminal of the subtractor 104 connects to an input terminal of a horizontal low-pass filter 106. An output terminal of the horizontal low-pass 15 filter 106 connects to an input terminal of a post-processor 108. An output terminal of post-processor 108 connects to a circuit utilizing the motion signal (not shown).

In the operation of the FIG. 1 motion detector, the composite video signal 110 supplied through the input terminal 100 includes luminance and chrominance signals. The frame memory 102 delays the video signal including the luminance and chrominance signals by one frame interval, and supplies the one-frame-delayed signal to the subtrahend terminal of the subtractor 104. The subtractor 104 differentially combines the composite video signal 110 and the one-frame-delayed response thereto to detect the difference signal between the frames, which signal is the derivative with respect to time of the composite video signal 110. A signal 111 at the output of the subtractor 104 includes motion information in the entire range of spatial frequencies, and is commonly thought of as including chrominance information only in the higher horizontal spatial frequencies. Therefore, the chrominance information in the higher horizontal spatial frequencies can be suppressed using the horizontal low-pass filter 106 to extract the motion information included in the horizontal low frequencies. The output signal 112 of the filter 106 changes directly with the contrast in luminance values of successive samples of corresponding picture elements in the changing portions of the image. This contrast in luminance tends to be greater for faster moving edges. The signal has the largest amplitude at the edge of an object having the greatest contrast with respect to the background of the moving portion of the image. When the background and the moving portions of the image become close to each other in luminance value, the motion signal weakens. Furthermore, a fast-moving object having a soft edge has a weak motion signal. Even if the fast motion signal is greatly contrasted to the object, it is usually strong only in the pixels of the moving edge. To minimize the effect of such a variable in the motion signal, threshold detection and signal spreading procedures are performed in post-processor 108.

The motion signal is used in another part of the image processing apparatus (not shown) to adaptively process the video signal. For example, when video tape recording folded-luminance signals as described in U.S. Pat. No. 5,113,262, the composite video signal at the terminal 100 may be supplied to an adaptive spatio-temporal filter, the switching between modes of which adaptive filter is controlled by the motion signal.

The threshold detection process performed in post-processor 108 is generally one in which the signal is, in effect, full-wave rectified or its absolute value taken. Accordingly, it is the absolute value of the amplitude, or the magnitude, of the frame-to-frame change that is threshold detected to generate indications that there is motion in a portion of the image. Therefore, it does not affect the operation of the motion detector if the minuend and subtrahend connections of the subtractor 104 are reversed from those shown in FIG. 1, so that the polarity of the frame comb filter response supplied from the subtractor 104 difference output terminal is reversed.

The frame memory 102 and the subtractor 104 together form one of the most common forms of high-pass frame comb filter. Another common high-pass frame comb filter is similar except that the composite video signal 110 and the one-frame-delayed response are weighted by factors +0.5 and −0.5 respectively and added in a weight-and-sum circuit that replaces the subtractor 104. A more expensive high-pass frame comb filter is one that uses cascaded frame comb filters so the composite video signal 110, the one-frame-delayed response, and a two-frame-delayed response are available to be weighted by factors −0.25, +0.5 and −0.25 respectively and added in a weight-and-sum circuit. Motion detectors of alternative design may use these other high-pass frame comb filters or may use high-pass field comb filters, although the use of field comb filters involves some amount of spatial filtering as well as temporal filtering.

Figure 2A:
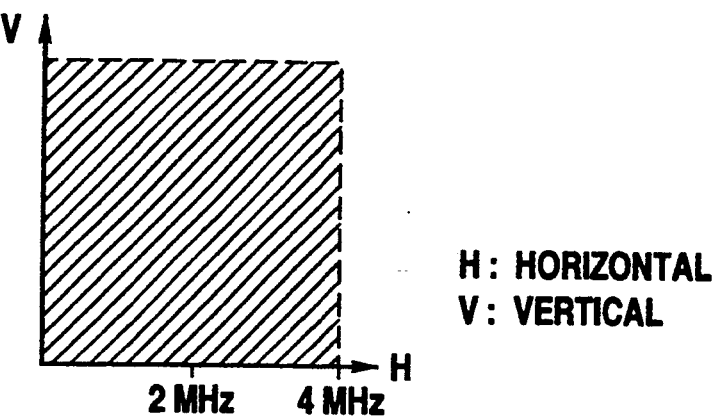
FIGS. 2A through 2C show spatial frequency domains of interest in describing the operation of the FIG. 1 motion detector and its capability of detecting frame-to-frame changes.
Figure 2B:
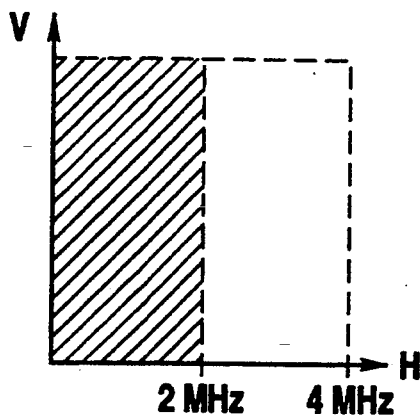
Figure 2C:
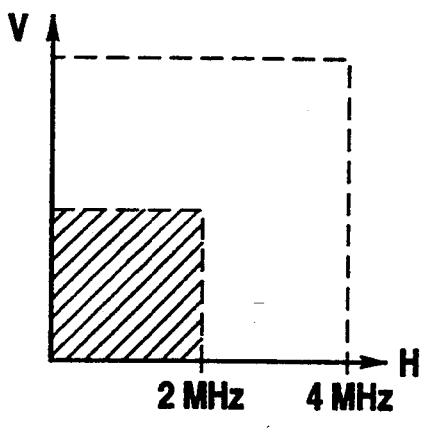

In the motion detectors as described above, the area in the two-dimensional spatial-frequency spectrum over which the motion signal is detected does not include all the spatial frequencies in the video signal, as is shown in FIGS. 2A–2C. That is, when motion is evidenced in the higher predominantly-horizontal-spatial-frequencies subspectrum or in the higher diagonal-spatial-frequencies subspectrum where the chrominance information is located, motion goes undetected. However, it is desirable that the motion signal be formed including motion detected from the higher predominantly-horizontal-spatial-frequencies subspectrum. It is further desirable that the motion signal be formed suppressing only the higher diagonal-spatial-frequencies subspectrum in which the chrominance information is located where motion-generated luminance components are nearly impossible to distinguish from chrominance components, rather than suppressing greater portions of the spatial-frequency spectrum of the composite video signal. The construction and operation of the motion detector according to the invention will now be described in detail with reference to FIGS. 3–7.

In the FIG. 3 motion detector, as in the FIG. 1 motion detector, composite video signal from a video signal source (not shown) is supplied via the input terminal 100. The input terminal 100 is connected to the write input connection of the frame memory 102 and to the minuend terminal of the subtractor 104, which is a first subtractor in the FIG. 3 circuit. The read output connection of the frame memory 102 connects to the subtrahend terminal of the subtractor 104. The post-processor 108 has its output terminal connected to a circuit utilizing a motion signal (not shown). When video tape recording folded-luminance signals as described in U.S. Pat. No. 5,113,262, the composite video signal at the terminal 100 may be supplied to an adaptive spatio-temporal filter, the switching between modes of which adaptive filter is controlled by the motion signal generated by the FIG. 3 motion detector. The horizontal low-pass filter 106 that in FIG. 1 connects the difference output terminal of the subtractor 104 to the input terminal of the post-processor 108 is replaced in FIG. 3 with a different filter 212 for suppressing the chrominance information in the high-pass frame comb filter response supplied from the difference output terminal of the subtractor 104.

This chroma-suppressing filter 212 is of a type that suppresses only diagonal high frequencies in the spatial-frequency domain and is constructed as follows. A second subtractor 204 has a minuend input terminal, to which the difference output terminal of the first subtractor 104 connects directly, and has a subtrahend input terminal, to which the difference output terminal of the first subtractor 104 connects via the cascade connection of a horizontal high-pass filter 200 and a vertical high-pass filter 202. FIG. 3 shows the difference output terminal of the first subtractor 104 connecting to an input terminal of the horizontal high-pass filter 200, the output of the horizontal high-pass filter 200 connecting to the input terminal of the vertical high-pass filter 202 and the output terminal of the vertical high-pass filter 202 connecting to the subtrahend terminal of the second subtractor 204. The difference output terminal of the second subtractor 204 is connected for supplying the output response of the filter to the input of the post-processor 108.

Alternatively, the vertical high-pass filter 202 may precede the horizontal high-pass filter 200 in their cascade connection. Since it is the absolute value of the amplitude of the frame-to-frame change that is threshold detected in the post-processor 108 to generate indications that there is motion in a portion of the image, it does not affect the operation of the motion detector if the minuend and subtrahend connections of either or both the subtractors 104 and 204 are reversed from those shown in FIG. 3. Another modification that can be made is to raise the cut-off frequency of the horizontal high-pass filter 200 to 3 MHz, taking into account that in an NTSC composite video signal most of the chrominance signal energy is within a band extending 0.5 MHz either side of the 3.58 MHz chroma subcarrier; this modification extends still further the range of horizontal spatial frequencies for which motion can be detected.

In the operation of FIG. 3, the composite video signal 110 supplied via the input terminal 100 includes luminance and chrominance signals. The operation of the frame comb filter comprising the frame memory 102 and the first subtractor 104 is the same as in the FIG. 1 motion detector. The signal 111 at the output of first subtractor 104 includes motion information in the entire domain of spatial frequencies, and includes chrominance information only in the region of that domain consisting of the higher horizontal spatial frequencies. More particularly, in the region of higher horizontal spatial frequencies, the chrominance information in an NTSC signal is only in the subregion of higher vertical spatial frequencies as well as higher horizontal spatial frequencies. This is the subregion of higher diagonal spatial frequencies. Signal 111 passes through horizontal high-pass filter 200, so that its components in the region of higher horizontal spatial frequencies are detected. A signal 206 (as shown in FIG. 4A) detected in the horizontal high-pass filter 200 passes through the vertical high-pass filter 202, so as to detect components in the subregion of higher diagonal spatial frequencies, including the chrominance signal component. A delay line 214 delays the output signal 111 from the first subtractor 104, indicative of the changes in picture elements between frames, by an interval equal to the combined latency times of the horizontal high-pass filter 200 and the vertical high-pass filter 202. (The latency time of a filter is the time interval it takes for a response to a step input signal applied to its input terminal to appear at its output terminal.) The second subtractor 204 differentially combines the delay line 214 response with the chrominance signal 208 (as shown in FIG. 4B) selected from the output signal 111 by the cascaded horizontal high-pass filter 200 and vertical high-pass filter 202. This provides a response at the difference output terminal of the subtractor 204 in which only higher diagonal spatial frequencies are suppressed and produces an improved motion signal 210.

The improved motion signal 210 includes not only that region of the spatial region consisting of the lower horizontal spatial frequencies (as in the FIG. 1 signal 112 as illustrated in FIG. 2B), but also includes (as shown in FIG. 4C) a subregion of the region of higher horizontal spatial frequencies of lower vertical spatial frequencies from which there is no need to remove chrominance signal component. Therefore, motion is detected even if the motion has higher horizontal spatial-frequency component, as long as the vertical spatial-frequency component is not also higher, as in the case of detail information moving in a diagonal direction. Since there is more tendency towards horizontal motion than diagonal motion in many frequently-encountered types of television images, the improvement in the motion signal 210 is a significant one.

FIG. 5 shows how another shortcoming of the prior art motion detector is overcome in accordance with another aspect of the invention. When the prior art motion detector is used in generating a motion signal that controls the adaptive luminance separator 104 shown in FIG. 3 of U.S. Pat. No. 5,113,262 an undesirable cross-luminance condition occurs when there is motion of an object against a background of the same luminance level but of different color. When this condition occurs, which fortunately rarely happens, motion goes undetected by the FIG. 1 motion detector, which is insensitive to chrominance because it is above the cut-off frequency of the horizontal low-pass filter 106. The adaptive luminance separator 104 shown in FIG. 3 of U.S. Pat. No. 5,113,262 responds to the lack of motion indication to process the luminance as if the currently scanned region were stationary, using frame comb circuitry that can include as elements of its structure the frame memory 102 and the subtractor 104 of the FIG. 1 motion detector specified herein. While chrominance signals descriptive of stationary objects cancel from frame to frame in frame comb circuitry, chrominance signals descriptive of moving objects do not and so generate undesirable cross-luminance components. The generation of these undesirable cross-luminance components can be avoided by using a pre-filter 312 connected as shown in FIG. 5 to remove the chrominance signals giving rise to them from the signal applied to the adaptive processing circuitry for luma (i.e., the adaptive luminance separator 104 shown in FIG. 3 of U.S. Pat. No. 5,113,262).

In FIG. 5, composite video signal from a video signal source (not shown) is supplied via the input terminal 100 to the pre-filter 312. The pre-filter 312 suppresses chrominance signal component in its response 310 supplied to a motion detector of structure similar to that of the FIG. 1 motion detector of the prior art. In the FIG. 5 embodiment of the invention the subtractor 104 is considered as being a second subtractor, there being a preceding first subtractor 304 in the pre-filter 312.

The structure of the pre-filter. 312 is as follows. A delay line 314 delays a composite video signal, supplied to the input terminal 100 from a source not shown, by the latency of a cascade connection of a horizontal high-pass filter 300 and a vertical high-pass filter 302 The first subtractor 304 has a minuend input terminal, to which the delayed composite signal response from the delay line 314 is applied, and has a subtrahend input terminal, to which the input terminal 100 connects via the cascade connection of filters 300 and 302. FIG. 5 shows the input terminal 100 connecting to an input terminal of the horizontal high-pass filter 300, the output of the horizontal high-pass filter 300 connecting to the input terminal of the vertical high-pass filter 302 and the output terminal of the vertical high-pass filter 302 connecting to the subtrahend terminal of the first subtractor 304. For the NTSC system, the cut-off frequency of the horizontal high-pass filter is 3 MHz, so the chroma sidebands on either side of a 3.58 MHz suppressed carrier are suppressed. The difference output terminal of the first subtractor 304 is connected for supplying the output response of the filter to the input of the frame comb filter comprising elements 102 and 104 included in a motion detector of the same type as shown in FIG. 1. Therefore, the remaining composition of FIG. 5 is substantially the same as that of FIG. 1 and the detailed compositional descriptions are omitted.

Alternatively, the vertical high-pass filter 302 may precede the horizontal high-pass filter 300 in their cascade connection. Since it is the absolute value of the amplitude of the frame-to-frame change that is threshold detected in the post-processor 108 to generate indications that there is motion in a portion of the image, it does not affect the operation of the motion detector if the minuend and subtrahend connections of either or both the subtractors 304 and 104 are reversed from those shown in FIG. 5.

In the operation of FIG. 5, the composite video signal 110 supplied via the input terminal 100 includes luminance and chrominance signals. The horizontal high-frequency component is detected through horizontal high-pass filter 300. A signal 306 detected in horizontal high-pass filter 300 passes through vertical high-pass filter 302, so that the chrominance signal is detected. Second subtractor 304 subtracts a chrominance signal 308 formed via horizontal high-pass filter 300 and vertical high-pass filter 302 from the composite video signal 100 as delayed by the delay line 314, and forms a video signal 310 in which the higher diagonal spatial-frequency components are suppressed. The video signal 310, from which the higher diagonal spatial-frequency components have been removed, is supplied to the motion detector of the same type shown in FIG. 1. Therefore, the subsequent operation of the FIG. 5 circuitry is the same as that described above in connection with FIG. 1 and detailed descriptions are omitted. However, FIGS. 6A–6C show the motion signal detecting frequency domains when a horizontal high-pass filter having a cut-off frequency of 3 MHz is used in the motion detector.

FIG. 5 also shows the signal 308 at the output of the cascade connection of the filters 300 and 302 being supplied as separated chroma to the chroma processing circuitry (not shown). The video signal 310, in which the higher diagonal spatial-frequency components are suppressed, is shown being supplied to the adaptive processing circuitry (not shown), instead of that circuitry being supplied the signal 110 containing diagonal spatial-frequency components of both luma and chroma. This eliminates cross effects of chroma into luminance in the case where chroma motion occurs without apparent luma motion.

FIG. 7 modifies the FIG. 5 circuitry by replacing the horizontal low-pass filter 106 with a filter that suppresses only the subregion of higher diagonal spatial frequencies. That is, the structural advance of the FIG. 3 motion detector over the FIG. 1 motion detector is incorporated into the FIG. 7 motion detector. There is, however, a new synergism in the FIG. 7 motion detector. The cascading of two chrominance-suppressing filters eases the cut-off requirements on each of them, required to maintain an overall chrominance rejection specification. For the NTSC system, the cut-off frequency of each of the horizontal high-pass filters 200 and 300 can be 3 MHz, so frame-to-frame luminance changes are detected over a larger portion of the two-dimensional spatial-frequency spectrum.

The composite video signal 110 supplied via the input terminal 100 includes luminance and chrominance signals; and the pre-filter 312 is a first chroma-suppressing filter, responding to that composite video signal 110, to generate the pre-filter response 310 in which the chrominance signals are suppressed. The pre-filter response 310 is supplied to the frame comb filter comprising the frame memory 102 and the second subtractor 104, which is the same as in the FIG. 5 motion detector. The frame comb filter supplies, as the difference output signal of the subtractor 104, the derivative with respect to time of the luminance signal—that is, the frame-to-frame changes of the luminance signal. The difference output signal of the subtractor 104 is supplied to a second chroma-suppressing filter 212' of a type that suppresses only diagonal high frequencies in the spatial-frequency domain and is similar to the chroma-suppressing filter 212 of FIG. 3 except for the horizontal high-pass filter 200 having a cut-off frequency of 2 MHz being replaced by a horizontal high-pass filter 200′ having a cut-off frequency of 3 MHz. In the FIG. 7 motion detector the subtractor 204 is a third subtractor, succeeding the first subtractor 304 and the second subtractor 104, and has its difference output terminal connected for supplying the output response of the second chroma-suppressing filter to the input terminal of the post-processor 108.

In another embodiment of the invention that is a variant of the FIG. 7 circuitry, the second chroma-suppressing filter 212′ is replaced by a chroma-suppressing filter 212, as used in FIG. 3.

FIG. 8 shows an alternative chroma-suppressing filter 412 that can replace any one of: the chroma-suppressing filter 212 of FIG. 3, the chroma-suppressing pre-filter 312 of FIG. 5 or 7, and the chroma-suppressing filter 212′ of FIG. 7. This alternative chroma-suppressing filter 412 uses a cascade connection of a horizontal high-pass filter 400 following a vertical high-pass filter 402 to generate, in response to an input signal received at an input terminal 414 of the filter 412, the subtrahend input signal for a subtractor 404. The minuend input signal for the subtractor 404 is delayed response to an input signal received at an input terminal 414 of the filter 412. The difference output signal from one subtractor 404 is the output signal of the filter 4 12 supplied via its output terminal 416.

The vertical high-pass filter 402 includes a cascade connection of delay lines 4021 and 4022 connecting from the filter 12 input terminal 414 , each of which delay lines has a latency time equal to the duration 1H of a single horizontal scan line. The cascade connection of delay lines 4021 and 4022 provides a three-tap delay line as can be used together with a weight-and-sum circuit for implementing a transversal filter, such as the vertical high-pass filter 402. To provide the weighting in the weight-and-sum circuit for the vertical high-pass filter 402, the filter 412 input signal as applied to the terminal 414 is weighted by a factor 0.25 by a two-bit-place shift towards reduced significance in a shifter 4023, the filter 412 input signal as delayed by the duration of a single scan line in the delay line 4021 is weighted by a factor 0.5 by a one-bit-place shift towards reduced significance in a shifter 4024 , and the filter 412 input signal as delayed by the duration of two scan lines in the cascaded delay lines 4021 and 4022 is weighted by a factor 0.25 by a two-bit-place shift towards reduced significance in a shifter 4025. A three-input summation circuit 4026 subtracts the combined responses of the shifters 4023 and 4025 from the response of the shifter 4024 to generate a signal 406 that is the response of the vertical high-pass filter 402. The summation circuit 4026 can, by way of example, comprise an adder for summing the responses of the shifters 4023 and 4025 and a subtractor for subtracting the resultant sum from the response of the shifter 4024. The spatial-frequency domain of the signal 406 is indicated by the cross-hatched region in FIG. 9A.

The horizontal high-pass filter 400 comprises a multiply-tapped delay line 4001, for generating variously delayed responses to the response 406 of the vertical high-pass filter 402 and a weight-and-sum circuit 4002, for generating a signal 408 that is the response of the horizontal high-pass filter 400. The spatial-frequency domain of the signal 408 is indicated by the cross-hatched region in FIG. 9B and is the same as the spatial-frequency domain of the signal 308 in FIG. 6B.

The difference output signal the subtractor 404 supplies to the filter 412 into terminal 414 will extend over the same spatial-frequency domain as the signal 310 shown in FIG. 6C, then, assuming that the minuend input signal to the subtractor 404 is a delayed response to the signal supplied to the filter 412 input terminal 414 that has a latency time equal to the combined latency times of the cascaded filters 402 and 400. The vertical high-pass filter 402 has a latency time equal to the duration of a single scan line (or slightly more depending on the latency time of the weight-and-sum circuit comprising the elements 4023–4026). Placing the vertical high-pass filter 402 before the horizontal high-pass filter 400 in their cascade connection, rather than after, is preferred because the single-scan-line (1H) delay provided to the filter 412 input signal by the 1H delay line 4021 can be utilized to provide most of the necessary delay of the minuend input signal for the subtractor 404. The 1H delay provided to the filter 412 input signal by the 1H delay line 4021 is augmented by the delay of an equalizing delay line 418 that furnishes delay compensating for the latency time of the horizontal high-pass filter 400 and for any non-zero latency time of the weight-and-sum circuit comprising the elements 4023-4026. The latency time of the horizontal high-pass filter 400 will be half that of the delay line 4001 as between its initial, input-signal tap and its final tap, as augmented by any non-zero latency time of the weight-and-sum circuit 4002. The equalizing delay line 418 can be a shift register, and the multiply-tapped delay line 4001 can be a shift register of serial-in/parallel-out type.

Alternatively, instead of providing this equalizing delay by the delay line 418, it can be provided by an initial portion of the 1H delay line 4022, but this will require tapping the delay line 4022. However, where the 1H delay lines are formed using respective read-then-write memories or using a two-line memory banked by line, each of which is a structure likely to be used, it may be inconvenient to tap the 1H delay line 4022.

Where the chroma-suppressing filter 412 is used to replace the pre-filter 312, the signal 408 is a separated chrominance signal that can be supplied to chroma processing circuitry (not shown).

What is claimed is:

1. A motion detector for use with a video signal source supplying a raster-scanned composite video signal descriptive of successive television image fields, said composite video signal including component luminance and chrominance signals, said motion detector comprising:

an input terminal for connection to said video signal source;

a comb filter connected for responding to said composite video signal as supplied via said input terminal, said comb filter being of a type for generating as its response a derivative primarily with respect to time of said composite video signal;

a chroma-suppressing filter, which filter is of a type that suppresses only diagonal high frequencies in the spatial-frequency domain and is connected for responding to the response of said comb filter to provide a corresponding response in which any said component chrominance signal is suppressed; and a post-processor for performing an absolute value detection process and a signal spreading process on the output signal of said chroma-suppressing filter.

2. A motion detector as set forth in claim 1 wherein said comb filter essentially consists of a frame comb filter.

3. A motion detector as set forth in claim 2 wherein said frame comb filter is of a type comprising:
a memory being arranged for temporarily storing a complete frame of video signal samples, having a write input connection from said input terminal for connection to said video signal source and having a read output connection for supplying one-frame-delayed video signal samples; and
means for generating the response of said frame comb filter responsive to differentially combining video signal samples supplied to the write input connection of said memory and corresponding one-frame-delayed video signal samples supplied from the read output connection of said memory.

4. A motion detector as set forth in claim 3 wherein said chroma-suppressing filter comprises:
a chroma-separating filter, which filter is of a type that selects as its response only diagonal high frequencies in the spatial-frequency domain and is connected for responding to the response of said comb filter; and
means for generating the response of said chroma-suppressing filter responsive to differentially combining the responses of said frame comb filter and of said chroma-separating filter.

5. A motion detector as set forth in claim 4 wherein said chroma-separating filter comprises:
a horizontal high-pass filter and
a vertical high-pass filter arranged in a cascade connection.

6. A motion detector as set forth in claim 4 wherein said chroma-separating filter comprises:
a horizontal high-pass filter and
a vertical high-pass filter connected after said horizontal high-pass filter in a cascade connection.

7. A motion detector as set forth in claim 1 wherein said chroma-suppressing filter comprises:
a chroma-separating filter, which filter is of a type that selects as its response only diagonal high frequencies in the spatial-frequency domain and is connected for responding to the response of said comb filter; and
means for generating the response of said chroma-suppressing filter responsive to differentially combining the responses of said comb filter and of said chroma-separating filter.

8. A motion detector as set forth in claim 7 wherein said chroma-separating filter comprises:
a horizontal high-pass filter and
a vertical high-pass filter arranged in a cascade connection.

9. A motion detector as set forth in claim 7 wherein said chroma-separating filter comprises:
a horizontal high-pass filter and
a vertical high-pass filter connected after said horizontal high-pass filter-in a cascade connection.

10. A motion detector for use with a video signal source supplying a composite video signal including component luminance and chrominance signals, said motion detector comprising:
an input terminal for connection to said video signal source;
a frame memory for delaying the video signal supplied through said input terminal by one frame interval to generate a one-frame-delayed video signal;
a subtractor for receiving the video signal input through said input terminal and the one-frame-delayed video signal output from said frame memory and differentially combining them to generate a respective output signal;
a horizontal high-pass filter and
a vertical high-pass filter arranged in a cascade connection for filtering the output signal of said subtractor to generate a combined filter response;
means for differentially combining said combined filter response and the output signal of said subtractor, to generate a respective output signal therefrom differentially responsive to said combined filter response and the output signal of said subtractor; and
a post-processor for performing an absolute value direction process and a signal spread process on the output signal of said means for differentially combining.

11. A motion detector as set forth in claim 10, wherein said horizontal highpass filter has an input connection to which the output signal of said vertical high-pass filter has an input connection to which the output connection of said horizontal high-pass filter connects.

12. A motion detector for use with a video signal source supplying a composite video signal including component luminance and chrominance signals, said motion detector comprising:
a preliminary filter including an input terminal for connection to said video signal source, a first cascade connection of
a first horizontal high-pass filter and
a first vertical high-pass filter, said first cascade connection supplying a response to the video signal supplied through said input terminal, and
first differentially-responsive means connected for differentially responding to the video signal supplied through said input terminal and said response thereto supplied from said first cascade connection of filters, thereby to generate a respective output signal from said first differentially-responsive means;
a comb filter connected for responding to the output signal of said first differentially-responsive means, said comb filter being of a type for generating as its response a derivative primarily with respect to time of the output signal of said first differentially-responsive means;
a chroma-suppressing filter for filtering the output of said comb filter; and
a post-processor for performing an absolute value detection process and a signal spread process on the response signal of said chroma-suppressing filter.

13. A motion detector as claimed in claim 12, wherein the cut-off frequency of said first horizontal high-pass filter is 3 MHz for the NTSC system.

14. A motion detector as set forth in claim 12, wherein said first horizontal high-pass filter has an input connection to which the output signal of said video signal source is applied and has an output connection; and wherein said first vertical high-pass filter has an input connection to which the output connection of said first horizontal high-pass filter connects.

15. A motion detector as set forth in claim 12 wherein said chroma-suppressing filter comprises:
   a horizontal low-pass filter for filtering the response of said comb filter.

16. A motion detector as set forth in claim 12 wherein said chroma-suppressing filter comprises:
   a second horizontal high-pass filter and
   a second vertical high-pass filter connected in a second cascade connection, for supplying a response to the output signal of said comb filter, and
   second differentially-responsive means, connected for differentially responding to the output signal of said comb filter and said response to the output signal of said comb filter supplied from said second cascade connection of filters, thereby to generate a respective output signal from said second differentially-responsive means, which respective output signal is supplied to said post-processor as an output signal from said chroma-suppressing filter.

17. A motion detector as claimed in claim 16, wherein the cut-off frequency said second horizontal high-pass filter is 3 MHz for the NTSC system.

18. A motion detector as claimed in claim 16 wherein said comb filter is a frame comb filter that comprises:
   a frame memory for delaying the output signal of said first differentially-responsive means by one frame interval to generate a respective output signal thereof; and
   a subtractor for generating the output signal of said frame comb filter differentially responsive to the output signals of said frame memory and of said first differentially-responsive means.

19. A motion detector as claimed in claim 12 wherein said comb filter is a frame comb filter.

20. A motion detector as claimed in claim 19 wherein said frame comb filter comprises:
   a frame memory for delaying the output signal of said first differentially-responsive means by one frame interval; and
   a subtractor for generating the output signal of said frame comb filter differentially responsive to the output signals of said frame memory and of said first differentially responsive means.

21. A motion detector for use with a video signal source supplying a raster-scanned composite video signal descriptive of successive televised image fields, said composite video signal including component luminance and chrominance signals; said motion detector comprising:
   an input terminal for connection to said video signal source;
   a comb filter connected for responding to said composite video signal as supplied via said input terminal, said comb filter being of a type for generating as its response a derivative primarily with respect to time of said composite video signal that essentially consists of a frame comb filter;
   a chroma-suppressing filter, which filter is of a type that suppresses only diagonal high frequencies in the spatial-frequency domain and is connected for responding to the response of said comb filter to provide a corresponding response in which any said component chrominance signal is suppressed; and
   a post-processor for performing an absolute value detection process and a signal spreading process on the response of said chroma-suppressing filter wherein said frame comb filter is of a type comprising
   a memory being arranged for temporarily storing a complete frame of video signal samples, having a write input connection from said input terminal for connection to said video signal source and having a read output connection for supplying one-frame,-delayed video signal samples; and
   means for generating the response of said frame comb filter responsive to differentially combining video signal samples supplied to the write input connection of said memory and corresponding one-frame-delayed video signal samples supplied from the read output connection of said memory wherein said chroma-suppressing filter comprises
   a chroma-separating filter, which filter is of a type that selects as its response only diagonal high frequencies in the spatial-frequency domain and is connected for responding to the response of said comb filter; and
   means for operating the response of said chroma-suppressing filter responsive to differentially combining the responses of said frame comb filter and of said chroma-separating filter and wherein said chroma-separating filter comprises
   a horizontal high-pass filter and
   a vertical high-pass filter arranged in a cascade connection, wherein said vertical high-pass filter comprises:
   first and second delay devices connected in series, for respectively delaying an input signal applied through an input terminal by a time equal to the duration IH of a single horizontal scan line; and
   a first weight-and-sum circuit, which satisfies the condition of a transversal filter with the input signal applied through said input terminal of said vertical high-pass filter and the respective output signals of said first and second delay devices.

22. A motion detector as set forth in claim 21, wherein said vertical high-pass filter is connected after said horizontal high-pass filter in said cascade connection in which they are arranged.

23. A motion detector as set forth in claim 21, wherein said first weight-and-sum circuit comprises:
   a plurality of shifters for shifting the output signals of said first and second delay devices and said input signal applied through said input terminal; and
   a summation circuit for summing the respective signals output from said shifters.

24. A motion detector as set forth in claim 23, wherein said vertical high-pass filter is connected after said horizontal high-pass filter in said cascade connection in which they are arranged.

25. A motion detector as set forth in claim 21, wherein said horizontal high-pass filter comprises:
   a tapped delay device for outputting a plurality of delayed signals with respect to the input of said horizontal high-pass filter; and
   a second weight-and-sum circuit for generating a weight-and-sum signal with respect to the respective output signals from said tapped delay device.

26. A motion detector as set forth in claim 25, wherein said vertical high-pass filter is connected after said horizontal high-pass filter in said cascade connection in which they are arranged.

27. A motion detector for use with a video signal source supplying a composite video signal including component luminance and chrominance signals, said motion detector comprising:

an input terminal for connection to said video signal source;

a frame memory for delaying the video signal supplied through said input terminal by one frame interval to generate a one-frame-delayed video signal;

a subtractor for receiving the video signal input through said input terminal and the one-frame-delayed video signal output from said frame memory and differentially combining them to generate a respective output signal;

a horizontal high-pass filter and a vertical high-pass filter arranged in a cascade connection for filtering the output signal of said subtractor to generate a combined filter response;

means for differentially combining said combined filter response and the output signal of said subtractor, to generate a respective output signal therefrom differentially responsive to said combined filter response and the output signal of said subtractor; and a post-processor for performing an absolute value detection process and a signal spread process on the output signal of said means for differentially combining, wherein said vertical high-pass filter comprises:

first and second delay devices connected in cascade, for respectively delaying an input applied through an input terminal by a time equal to the duration IH of a single horizontal scan line and by two horizontal scan line intervals, respectively, to generate respective output signals from said first and second delay devices; and a first weight-and-sum circuit, for combining the input signal applied through said input terminal of said vertical high-pass filter with the respective output signals of said first and second delay devices to generate a transversal filter response.

28. A motion detector as set forth in claim 27, wherein said first weight-and-sum circuit comprises:

a plurality of shifters for shifting the output signals of said first and second delay devices and said input signal applied through said input terminal; and a summation circuit for summing the respective signals output from said shifters.

29. A motion detector as set forth in claim 27, wherein said horizontal high-pass filter comprises:

a tapped delay device for outputting a plurality of delayed signals with respect to the input of said horizontal high-pass filter; and a second weight-and-sum circuit for generating a weight-and-sum signal with respect to the respective output signals from said tapped delay device.

30. A motion detector as set forth in claim 12, wherein said first vertical high-pass filter comprises:

first and second delay devices connected for delaying an input signal applied through an input terminal of said first vertical high-pass filter by one horizontal scan line interval and by two horizontal scan line intervals, respectively, to generate respective output signals from said first and second delay devices; and a first weight-and-sum circuit, for weighting said input signal applied through an input terminal of said first vertical high-pass filter, the output signal of said first delay device and the output signal of said second delay device in $-0.25:+0.50:-0.25$ ratio.

31. A motion detector for use with a video signal source supplying a composite video signal including component luminance and chrominance signals, said motion detector comprising;

a preliminary filter having an input terminal, including an a first horizontal high-pass filter and a first vertical high-pass filter connected after said first horizontal high-pass filter in a first cascade connection for supplying a response to the video signal supplied through said input terminal, and including first differentially-responsive means connected for differentially responding to the video signal supplied through said input terminal and said response thereto supplied from said first cascade connection of filters; thereby to generate a respective output signal from said first differentially-responsive means;

a comb filter connected for responding to the output signal of said first differentially-responsive means, said comb filter being of a type for generating as its response a derivative primarily with respect to time of the output signal of said first differentially-responsive means;

a chroma-suppressing filter, including a second horizontal high-pass filter and a second vertical high-pass filter in a second cascade connection for supplying a response to the output signal of said comb filters, and including second differentially-responsive means connected for differentially responding to the output signal of said comb filter and said response of said second cascade confection of filters to the output signal of said comb filter, thereby to generate a respective output signal for said chroma-suppressing filter; and a post-processor for performing an absolute value detection process and a signal spread process on the output signal of said chroma-suppressing filter, wherein said second vertical high-pass filter comprises:

first and second delay devices connected for respectively delaying an input applied through an input terminal by a time equal to the duration IH of a single horizontal scan line to generate an output signal from said first delay device and by a time equal to the twice the duration IH of a single horizontal scan line to generate an output signal from said second delay device; and a first weight-and-sum circuit for combining the input signal applied through said input terminal of said second vertical high-pass filter with the respective output signals of said first and second delay devices to generate a transversal filter response.

32. A motion detector for use with a video signal source supplying a composite video signal including component luminance and chrominance signals; said motion detector comprising:

a preliminary filter including an input terminal for connection to said video signal source, including a first vertical high-pass filter and a first horizontal high-pass filter connected after said first vertical high-pass filter in a first cascade connection for supplying a response to the video signal supplied through said input terminal, and including first differentially-responsive means connected for differentially responding to the video signal supplied through said input terminal and said response thereto supplied from said first cascade connection of filters, thereby to generate a respective output signal from said first differentially-responsive means;

first and second delay devices included in said first vertical high-pass filter, said first and second delay devices being connected for delaying an input signal applied through an input terminal of said first vertical high-pass filter by one horizontal scan line interval and by two horizontal scan line intervals, respectively, to generate respective output signals from said first and second delay devices;

a first weight-and-sum circuit included in said first vertical high-pass filter, said first weight-and-sum circuit being connected for weighting said input signal applied through an input terminal of said first vertical high-pass filter; the output signal of said first delay device and the output signal of said second delay device in $-0.25:+0.50:-0.25$ ratio;

a comb filter connected for responding to the output signal of said first differentially-responsive means, said comb filter being of a type for generating as its response a derivative primarily with respect to time of the output signal of said first differentially-responsive means;

a chroma-suppressing filter for filtering the response of said comb filter; and a post-processor for performing an absolute value detection process and a signal spread process on the output signal of said chroma-suppressing filter, wherein said first weight-and-sum circuit comprises:

a plurality of shifters for shifting the output signals of said first and second delay devices and said input signal applied through said input terminal; and a summation circuit for summing the respective signals output from said shifters.

33. A motion detector as set forth in claim 31, wherein said first weight-and-sum circuit comprises:

a plurality of shifter for shifting the output signals of said first and second delay devices and said input signal applied through input terminal; and a summation circuit for summing the respective signals output from said shifters.

34. A motion detector for use with a video signal source supplying a composite video signal including component luminance and chrominance signals, said motion detector comprising:

a preliminary filter including an input terminal for connection to said video signal source; including a first vertical high-pass filter and a first horizontal high-pass filter connected after said first vertical high-pass filter in a first cascade connection for supplying a response to the video signal supplied through said input terminal, and including first differentially-responsive means connected for differentially responding to the video signal supplied through said input terminal and said response thereto supplied from said first cascade connection of filters, thereby to generate a respective output signal from said first differentially-responsive means;

first and second delay devices included in said first vertical high-pass filter, said first and second delay devices being connected for delaying an input signal applied through an input terminal of said first vertical high-pass filter by one horizontal scan line interval and by two horizontal scan line intervals, respectively; to generate respective output signals from said first and second delay devices;

a first weight-and-sum circuit included in said first vertical high-pass filter, said first weight-and-sum circuit being connected for weighting said input signal applied through an input terminal of said first vertical high-pass filter, the output signal of said first delay device and the output signal of said second delay device in $-0.25:+0.50:-0.25$ ratio;

a tapped delay device included in said first horizontal high-pass filter for outputting a plurality of delayed signals with respect to the input of said horizontal high-pass filter;

a second weight-and-sum circuit included in said first horizontal high-pass filter for generating a weight-and-sum signal with respect to the respective output signals from said tapped delay device;

a comb filter connected for responding to the output signal of said first differentially-responsive means, said comb filter being of a type for generating as its response a derivative primarily with respect to time of the output signal of said first differentially-responsive means;

a chroma-suppressing filter for filtering the response of said comb filter; and a post-processor for performing an absolute value detection process and a signal spread process on the output signal of said chroma-suppressing filter.

35. A motion detector as set forth in claim 31, wherein said second horizontal high-pass filter comprises:

a tapped delay device for outputting a plurality of delayed signals with respect to the input of said second horizontal high-pass filter; and a second weight-and-sum circuit for generating a weight-and-sum signal with respect to the respective output signals from said tapped delay device.

36. A motion detector for use with a video signal source supplying raster-scanned composite video signals descriptive of successive television image fields, the supplied composite video signals comprising component luminance signals and component chrominance signals, said motion detector comprising:

a comb filter for generating time derivatives of said supplied composite video signals, which time derivatives occupy a two-dimensional spatial-frequency spectrum as defined by the way in which said supplied composite video signals are raster-scanned; and means for suppressing a portion of said time derivatives being a function of said component chrominance signals by suppressing only diagonal high frequencies in said spatial-frequency spectrum of said time derivatives.

37. A motion detector as set forth in claim 36, wherein said comb filter generates said time derivatives by calculating differences between said supplied composite video signals and one-frame-delayed composite video signals.

38. A motion detector as set forth in claim 36, wherein said suppressing means comprises:

means for diagonally high pass filtering said time derivatives to generate diagonally filtered derivatives; and means for calculating differences between said diagonally filtered derivatives and said time derivatives received from said comb filter.

39. A motion detector as set forth in claim 38, wherein said diagonally high pass filtering means comprises an horizontal high-pass filter serially connected with a vertical high-pass filter.

40. A motion detector for use with a video signal source supplying raster-scanned composite video signals descriptive of successive television image fields, the supplied raster-scanned composite video signals comprising component luminance signals and component chrominance signals, and for use with circuitry for utilizing said component luminance signals, said motion detector comprising;

a preliminary filter, responding to said raster-scanned composite video signals supplied from said video signal source, for generating filtered composite video signals in which said component chrominance signals of said filtered composite video signals are suppressed respective to said component luminance signals, said filtered composite video signals being supplied to said circuitry for utilizing said component luminance signals;

a comb filter for generating time derivatives of said filtered composite video signals in which said component chrominance signals are suppressed respective to said component luminance signals;

a low pass filter for low-pass filtering said time derivatives to generate low-pass filtered derivatives; and a post-processor for performing an absolute value detection of said low-pass filtered derivatives.

41. A motion detector as set forth in claim 40, wherein said preliminary filter comprises:

a horizontal high-pass filter serially connected with a vertical high-pass filter, for vertically high-pass filtering and horizontally high-pass filtering said supplied composite video signals to isolate said component chrominance signals; and means for generating said filtered composite video signals by differentially combining said component chrominance signals, generated by said horizontal high-pass filter serially connected to said vertical high-pass filter, with said received composite video signals.

42. A motion detector as set forth in claim 40, wherein said low-pass filter is an horizontal low-pass filter.

43. A motion detector as set forth in claim 40, wherein said low-pass filter comprises:

an horizontal high-pass filter serially connected with a vertical high-pass filter, for vertically high-pass filtering and horizontally high-pass filtering said time derivatives to generate high-pass filtered derivatives; and means for generating said low-pass filtered derivatives by differentially combining said time derivatives with said high-pass filtered derivatives.

* * * * *